United States Patent [19]

Clarke et al.

[11] Patent Number: 4,687,612
[45] Date of Patent: Aug. 18, 1987

[54] HEAT TREATING THERMOPLASTIC SHEET MATERIALS FOR THERMO-FORMING

[75] Inventors: John Clarke, Faringdon; Roderick M. D'Eath; Derek E. Haycock, both of Wantage, all of England

[73] Assignee: Metal Box Public Limited Company, Berkshire, England

[21] Appl. No.: 876,693

[22] Filed: Jun. 20, 1986

[30] Foreign Application Priority Data

Jun. 21, 1985 [GB] United Kingdom ........... 8515827

[51] Int. Cl.⁴ ............................................. B29C 17/03
[52] U.S. Cl. ................................ 264/322; 264/522; 425/383; 425/526
[58] Field of Search ............... 264/322, 522; 425/383, 425/384, 407, 526; 264/524

[56] References Cited

U.S. PATENT DOCUMENTS 3,907,480 9/1975 Renoux ........................ 425/383 X
3,917,770 11/1975 Jackson ........................ 264/322 X Primary Examiner—Charles Hart
Attorney, Agent, or Firm—St. Onge Steward Johnston & Reens

[57] ABSTRACT

An apparatus for, and a method of, heating a thermoplastic material in web form in readiness for forming three-dimensional objects therefrom in a thermo-forming process involves (a) advancing the web material intermittently through a heating zone on a belt conveyor without imposing thereon any mechanical stress-inducing physical constraints (such as may be applied by material gripping means), and (b) sweeping the web material with a series of hot air jets which are spaced apart in the direction movement of the material, which extend transversely across the width of the material, and which are reciprocated in that direction in a manner such as to ensure a uniform heating of the web material passing out of the heating zone to a thermo-forming apparatus.

46 Claims, 7 Drawing Figures

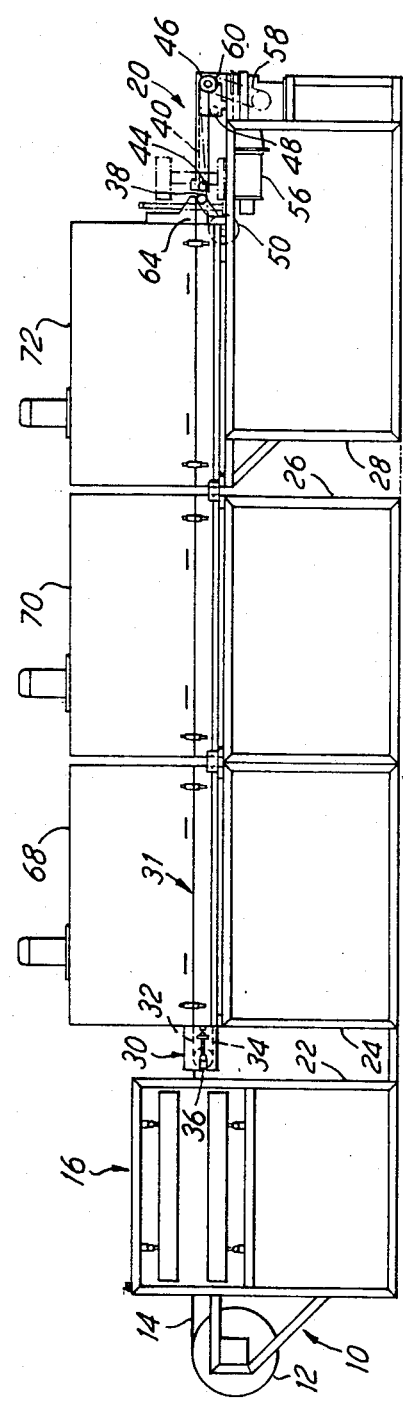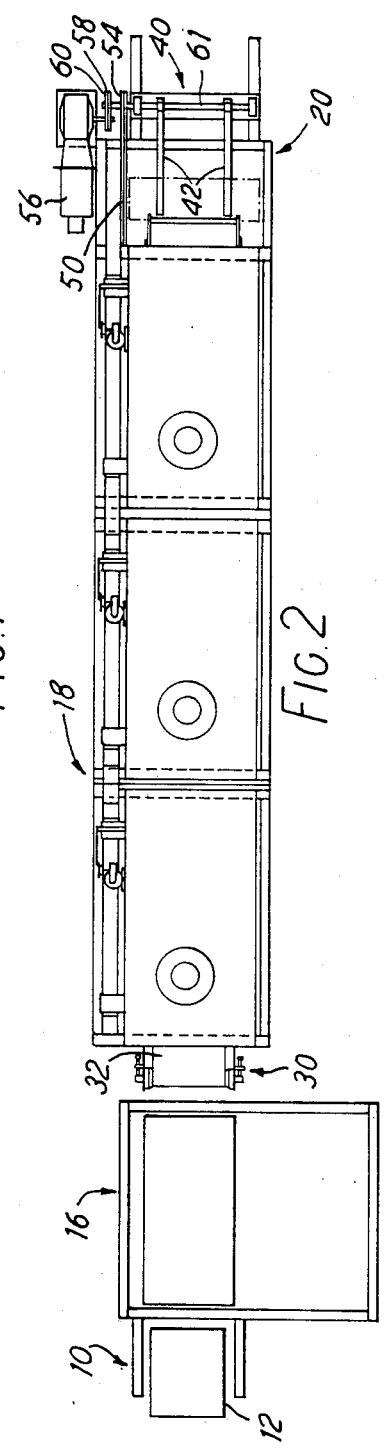

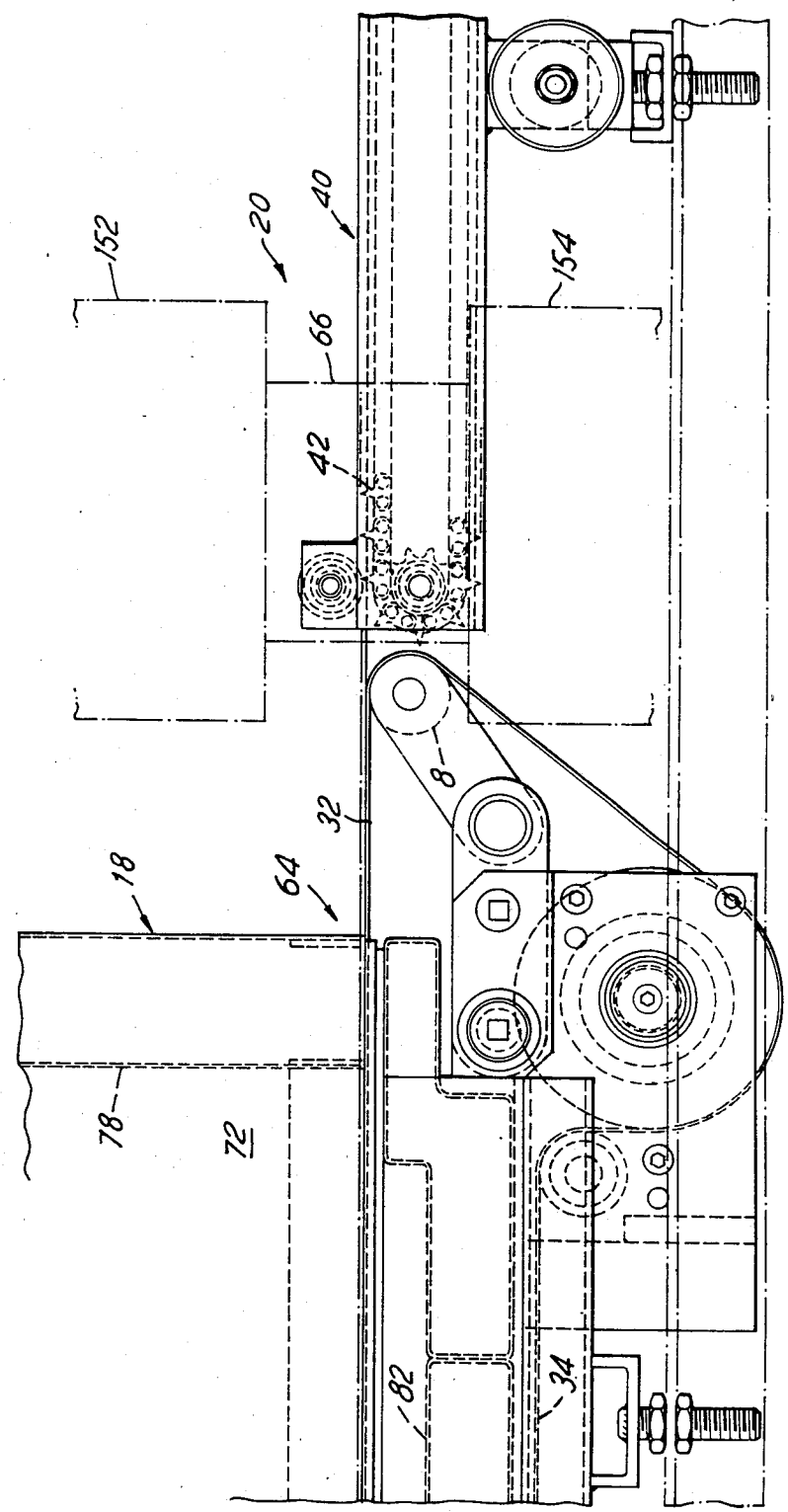

HEAT TREATING THERMOPLASTIC SHEET MATERIALS FOR THERMO-FORMING

This invention relates to an apparatus for, and a method of, heat treating sheet materials, in particular (but not exclusively) sheet materials so as to render them suitable for subsequent working in a thermo-forming process. The invention also extends to a thermo-forming system incorporating such a heat treating apparatus for thermoplastic sheet materials.

Thermo-forming processes have been used to convert an elongate sheet of a thermoplastic feedstock material into three-dimensionally shaped objects.

Attempts to thermo-form such a sheet material of polypropylene (noted for its heat resisting properties) to form, for example, drinking cups have not met with very satisfactory results. The relatively poor results achieved can be attributed in large part to a lack of adequate uniformity in the heating of the material in a heating apparatus through which the material passes on its way to the thermo-forming apparatus. This thermal inhomogeneity has been due to two major factors, namely (1) inherent non-uniformity of heating, and (2) thermal masking and mechanical distortion of the side margins of the sheet material, caused by gripping means which have been provided within the apparatus for transporting the sheet material through the heating apparatus for presentation to the thermo-forming apparatus.

Typical heating apparatus of this kind, as used in prior art thermo-forming operations, has comprised an infra-red heating apparatus in which the sheet material has been subjected to infra-red radiation. However, in order to achieve adequate control of heating by such means, relatively expensive and complex control arrangements are required, and even then adequate thermal homogeneity is not always assured.

According to the present invention, a heating apparatus suitable for delivering heated thermoplastic sheet material to a thermo-forming apparatus comprises:

a heating apparatus for sheet material, which comprises a thermally insulated enclosure having inlet and outlet openings for said sheet material to pass therethrough, support means within said enclosure for supporting said sheet to pass between said openings, movable gas delivery means within said enclosure, arranged to deliver to deliver hot gas on to said sheet material across substantially the width of the same, drive means arranged for reciprocating said delivery means to and fro longitudinally of the sheet material so that during each reciprocating movement the distributor covers a substantial length of the sheet material within the apparatus, conduit means including a fan arranged for receiving hot gas delivered by said delivery means to said sheet and for recirculating it to said delivery means, and heating means thermally associated with said conduit means for heating the recirculating gas in advance of said delivery means. More particularly, and as in the described embodiment, the heating apparatus may comprise:

(a) a thermally insulated heating chamber defining therein an elongate heating channel through the length of which said sheet material is to be intermittently moved;

(b) an intermittently driven belt conveyor having an upper belt portion thereof extending lengthwise through said heating channel, which belt portion is arranged for receiving thereon and freely supporting said sheet material for movement through the heating channel;

(c) a reciprocable hot-gas distributor disposed in said heating channel above said upper belt portion of said conveyor and having dependent therefrom a plurality gas orifices which are directed to issue hot gas downwardly towards said upper belt portion;

(d) a hot-gas supply source connected with said hot-gas distributor and arranged to supply hot gas at a predetermined temperature to said gas distributor for distribution through said orifices on to said sheet material as it moves through said heating channel;

(e) supporting means supporting said reciprocable gas distributor for reciprocation above said upper belt portion of said conveyor and longitudinally of the movement of said sheet material through the heating channel; and (f) driving means coupled with said gas distributor and arranged to reciprocate the distributor with such frequency and amplitude of movement in relation to the indexing movement of the sheet material that said sheet material exiting the heating chamber has a substantially uniform temperature over its plan area.

Advantageously, features (a) to (f) above may be further particularised as follows:

(1) each such gas orifice extends transversely across substantially the whole width of the said upper belt portion of the conveyor, the nozzles being spaced uniformly apart longitudinally of the direction of movement of the sheet material and being separated by transversely extending, open-bottomed channels of substantial cross-sectional area, through which the hot gas may flow above the sheet material.

(2) said gas distributor is suspended on either side from above, by pairs of transversely-spaced, pivoted, parallel links, and is reciprocated by one such pair of links which are drivingly coupled with said driving means;

(3) said insulated heating chamber houses said hot-gas supply source above said heating channel, and said gas supply source is connected to said gas distributor through a flexible duct so as to permit reciprocation of the distributor relative to said gas supply source;

(4) said hot-gas supply source includes a gas heating means and a fan for recirculating air through said heating means to said distributor;

(5) said gas distributor has an upwardly extending inlet portion which connects via the said flexible duct with the outlet of said gas supply source; and said hot gas supply source includes a horizontally-disposed, spirally-arranged gas flow duct system which extends from said flexible duct and incorporates in a series flow arrangement two heating units which are disposed transversely on either side of said distributor inlet portion and which constitute said gas heating means, and a said fan which is disposed ahead of said heating units, said flexible duct and said distributor inlet portion;

(6) said heating units are electrical resistance heating units;

(7) the heating apparatus is split into upper and lower parts at or near the plane of the said upper belt portion of said conveyor, and the upper part so formed is pivotally mounted at one longitudinal edge portion thereof on the adjoining longitudinal edge portion of the lower part, so as to permit the upper part to be pivotally raised and thereby expose the conveyor upper belt portion and any sheet material thereon; and (8) two or more such heating apparatuses are disposed end to end in a tandem arrangement so as to form a single, multi-section heat treatment oven through which preferably a single conveyor extends so as to constitute the respective conveyor of the respective heating apparatuses.

The present invention also extends to a system for forming three-dimensionally shaped objects from a thermoplastic sheet material, which system includes before and upstream of a thermo-forming apparatus at least one heating apparatus according to the present invention, for uniformly heating the feedstock material in readiness for presentation to the thermo-forming apparatus.

The present invention also provides a process for thermo-forming three-dimensionally shaped objects from a thermoplastic sheet material which process includes the steps of:

(a) transporting said sheet material intermittently from a supply source through a heating zone to a said thermo-forming apparatus; and (b) heating said sheet material in said zone so as to deliver it to said thermo-forming apparatus at a temperature suitable for the performance of the thermo-forming process in that apparatus; and in which process the step (a) includes supporting said sheet material for movement through said heating zone by a moving conveyor belt portion along and above which the sheet material freely extends; and the step (b) comprises heating said sheet material by directing on to its upper surface a flow of hot gas produced by a gas distributor which is reciprocated above the sheet material and longitudinally of the direction of movement thereof.

Other preferred features of the present invention will appear from a reading of the description that follows hereafter, and of the claims that are appended at the end of that description.

One thermo-forming system embodying the present invention, and various modifications thereof, will now be described by way of example and with reference to the accompanying diagrammatic drawings, in which:

FIGS. 1 and 2 show respectively side and plan views of the system, to a first scale;

FIG. 7 shows schematically, to a third and still larger scale, a side view of the juxtaposed parts of those two conveyors of FIG. 6.

Figure 3:
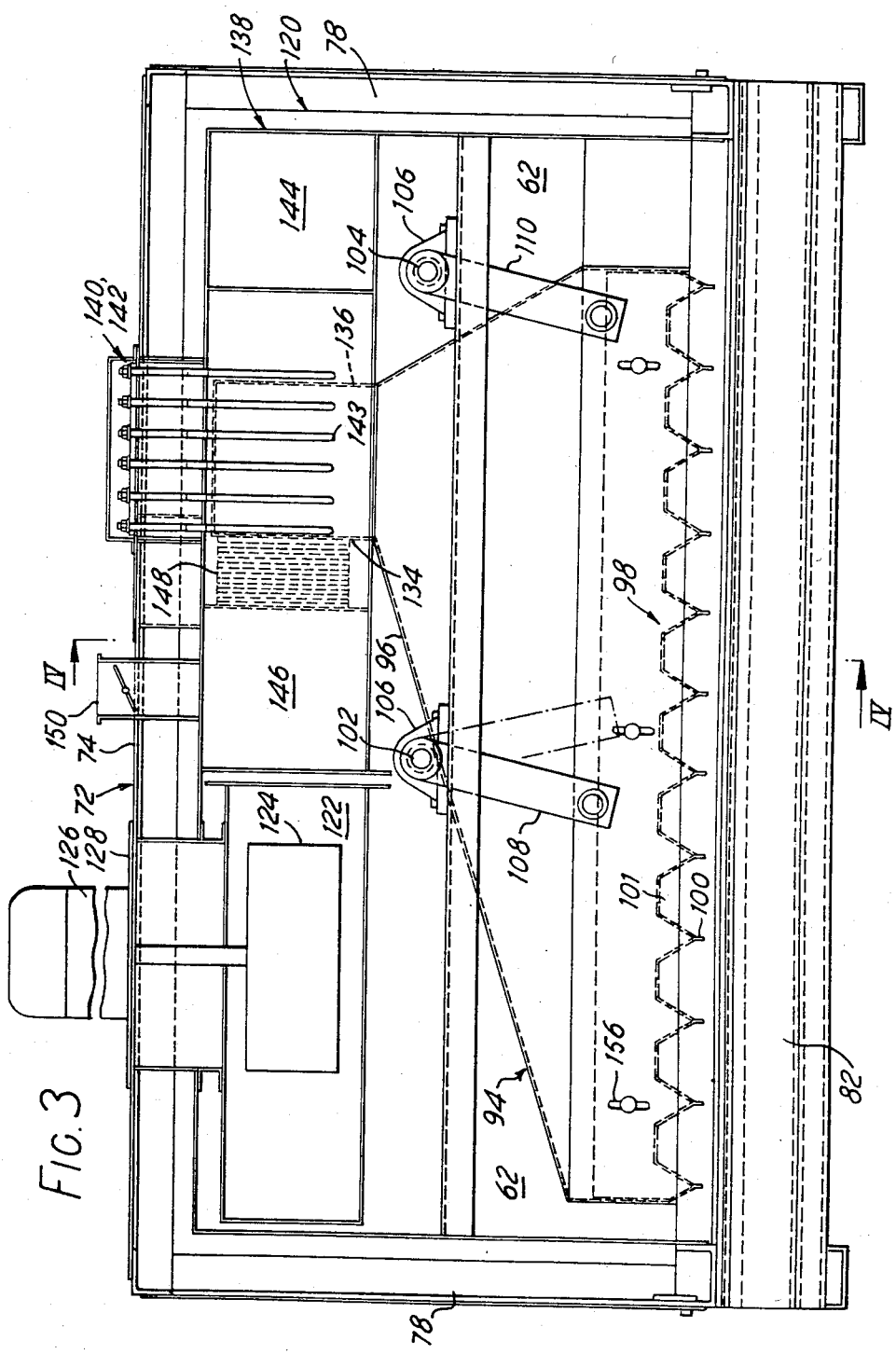
FIG. 3 shows schematically, to a second and larger scale, a side view of one section or module of a main heating oven which forms part of the system shown in the FIGS. 1 and 2.

Referring now to the FIGS. 1, 2, 6 and 7, the thermo-forming system there shown comprises the following units, proceeding from left to right:

(a) a feedstock supply unit 10 carrying a supply roll 12 of an elongate sheet feedstock material 14, for example, a multi-layer, polypropylene based sheet material 1.8 mm thick;

(b) an infra-red, pre-heating oven 16 through which the sheet material is fed from said roll 12;

(c) a triple-module, main heating oven 18 through which said sheet material is fed from said pre-heating oven; and (d) a thermo-forming apparatus 20 to which said sheet material is delivered from said main heating oven.

The respective units are carried on suitable frames 22-28 as indicated.

The main heating oven 18 incorporates (as said primary conveyor) a belt conveyor assembly 30, having a continuous belt 31 of PTFE-coated woven fibre glass construction of which the upper and lower runs 32,34 are stretched horizontally between rollers 36, 38 which are disposed externally of the oven at either end thereof. The thermo-forming apparatus 20 incorporates (as said secondary conveyor) a toothed-chain conveyor assembly 40, of which two transversely-spaced toothed chains 42 extend between end sprockets 44,46 and around tensioning sprockets 48.

The two conveyors are mechanically coupled together, and thus synchronised, by a first driving belt 50 which engages pulleys 52,54 of the respective conveyor assemblies 30 and 40. They are driven by a geared motor unit 56 through a belt 58 which engages with a further pulley 60; the pulley 60 is mounted on a drive shaft 61 of the conveyor assembly 40, the pulley 54 and the end sprockets 46 for the chains 42 being also mounted on this shaft. The motor unit 56 is controlled so as to operate intermittently whereby the sheet material is advanced in predetermined amounts towards the thermo-forming apparatus 20.

In operation of the system, the elongate feedstock sheet material 14 is drawn intermittently from the supply roll 12, and is fed through the preheating oven 16. From there it passes on to the upper run 32 of the primary conveyor assembly 30, so as to be freely supported thereby whilst moving along a heating channel 62 which extends lengthwise and generally horizontally through the main oven 18. The conveyor assembly 30 is substantially passive in relation to the sheet material, that is to say, it exercises a supporting function for the material but provides little or no forward drive for it.

The heated sheet material is delivered at the exit end 64 of the oven 18 to the toothed chain conveyor assembly 40 of the thermo-forming apparatus 20. The teeth of the respective toothed chains 42 of that conveyor indent or penetrate the respective side margins of the sheet material, thus positively propelling the sheet material forwards into, through and beyond the tooling 66 of a vertically reciprocable pressure forming press (not shown). The press has upper and lower platens 152,154 and constitutes part of the thermo-forming apparatus 20. Thus, the sheet material positively draws behind it other feedstock sheet material from the supply roll through the pre-heating and main ovens. The press and its platens 152, 154 are conventional and therefore are not described. The motor unit 56 is controlled to operate in synchronism with the press, so that the sheet material is stationary for the forming strokes of the press, but is indexed forward by a predetermined distance each time the press is opened.

The main heating oven 18 comprises three similar oven modules 68,70,72 disposed end to end in a tandem arrangement. The lower parts of those modules enclose and define said heating channel 62 through which the primary conveyor assembly 30 extends.

Figure 4:
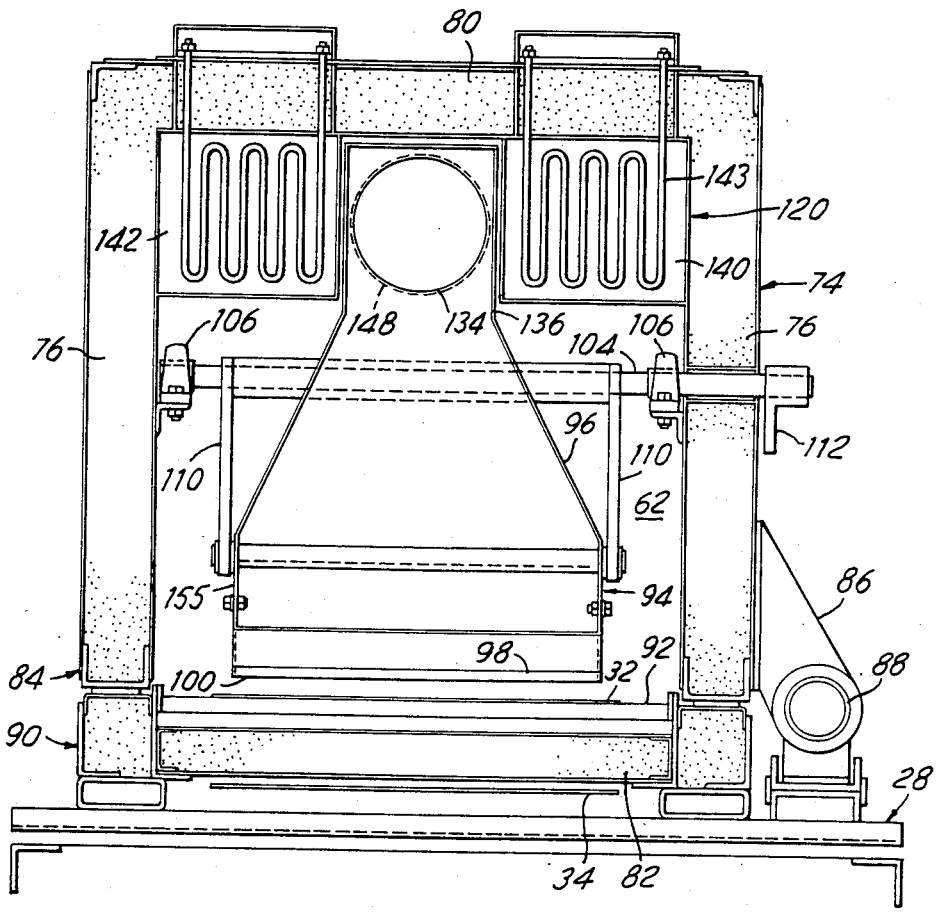
FIG. 4 shows schematically, to said second scale, a transverse vertical section through the heating oven module of FIG. 3, taken on the line designated IV—IV in the FIG. 3.
Figure 5:
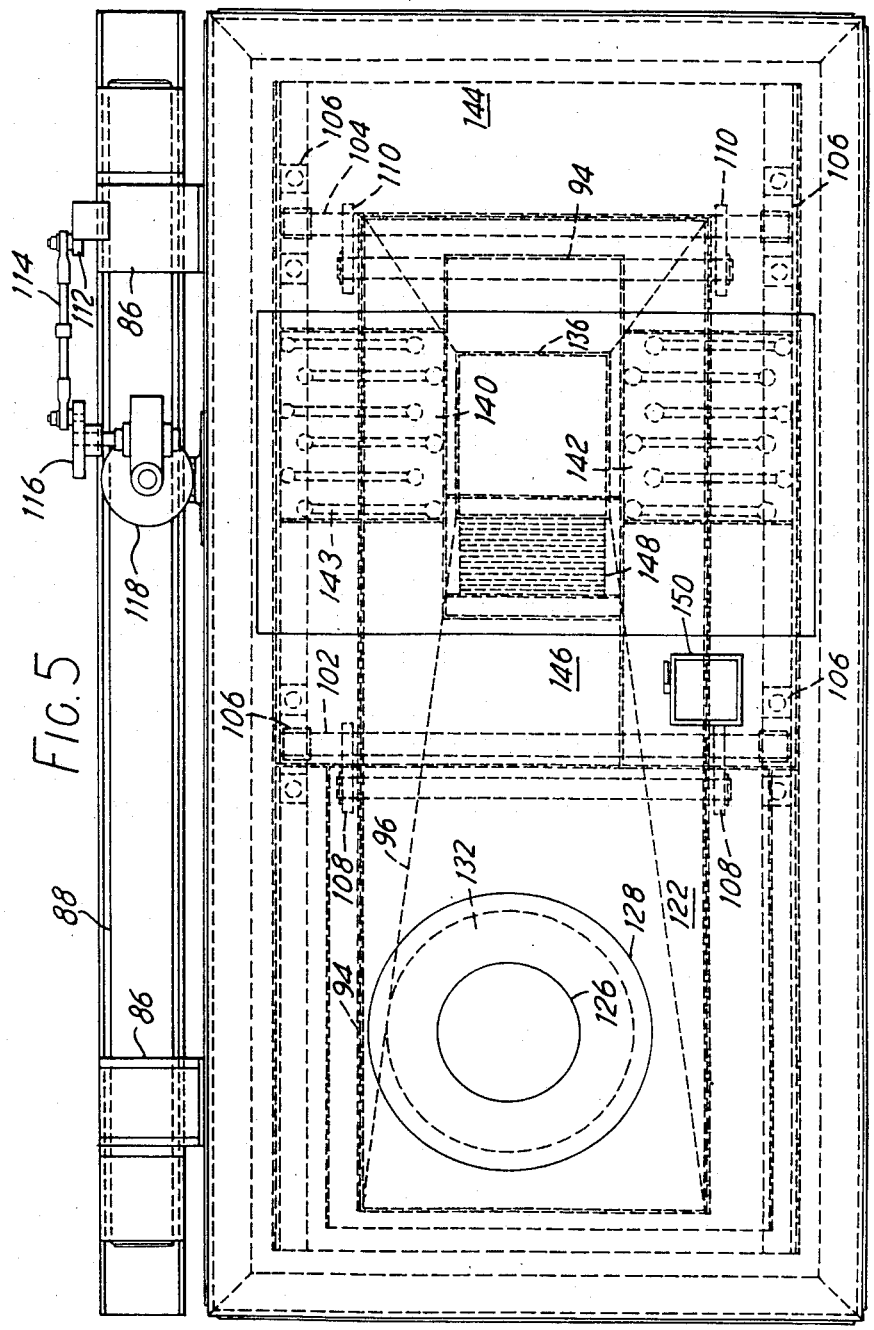
FIG. 5 shows schematically, to said second scale, a plan view of the heating oven module of FIG. 3.
Figure 6:
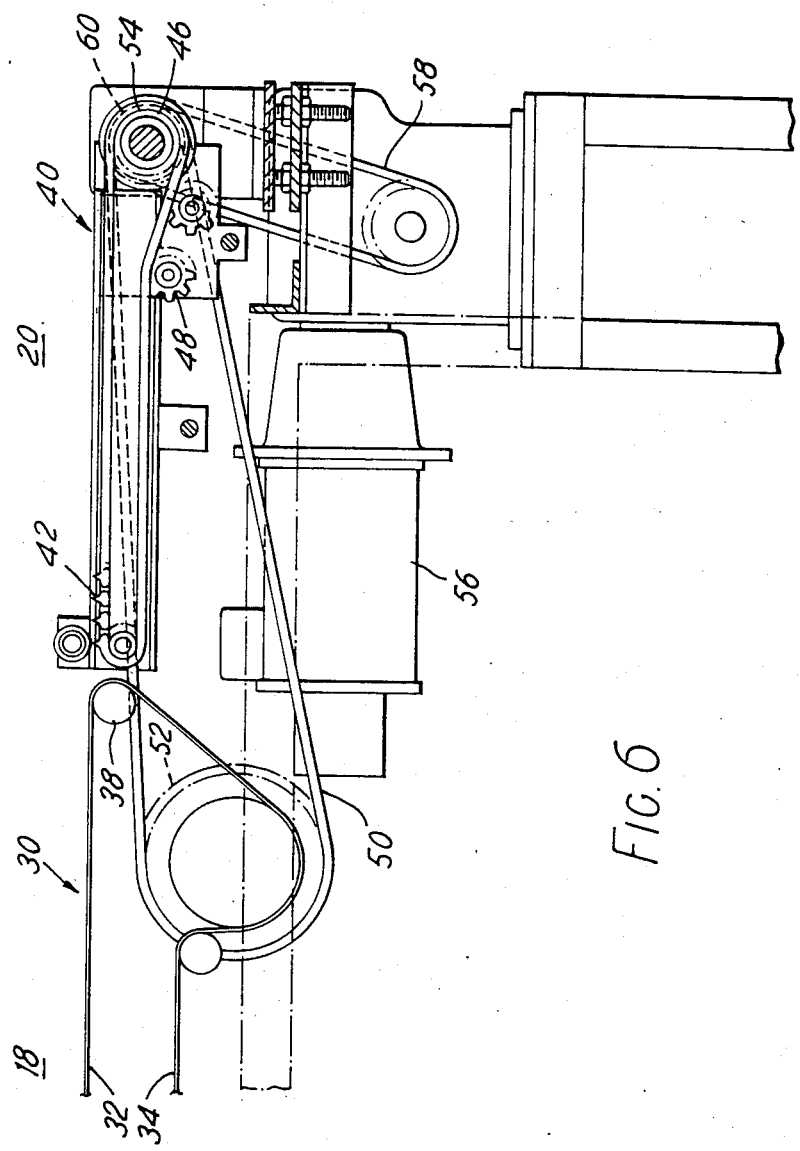
FIG. 6 shows schematically, to said second scale, a side view of a secondary conveyor, which forms part of a thermo-forming apparatus incorporated in said system, in juxtaposition with a primary conveyor which forms part of said main heating oven.

One such oven module 72 (the one disposed nearest the thermoforming apparatus) will now be described with reference to the FIGS. 3, 4 and 5. However, it is to be understood that the other two modules are generally similar in their arrangement and construction to that now to be described.

The oven module 72 comprises a thermally-insulated heating chamber 74 comprising sheet metal clad, thermally-insulating side walls 76, end walls 78, roof 80 and base 82. The end walls incorporate appropriate inlet and outlet openings through which the upper run 32 of the belt 31 passes. The side and end walls are split horizontally at their lower parts to form the module with an upper part 84 and a lower part 90. The upper part 84 is pivotally carried by means of hinge brackets 86 on a pivot shaft 88 which is itself carried alongside the lower part 90 of the module on the module frame 28. Thus, the upper part 84 of the module may be swung in a clockwise direction as seen in FIG. 4 about the pivot shaft 88 to expose the contents normally concealed within the heating channel 62, in particular the belt run 32 and any sheet material on it.

The upper run 32 of the primary conveyor assembly 30 is disposed above the insulated base 82 of the heating chamber, and is supported there on a flat bed 92 faced by stainless steel plates with small expansion gaps between them. The lower run 34 extends below that base, and is thus not enclosed within said heating channel and chamber.

Within the heating channel 62 and above the upper run 32 is disposed a hot-air distributor 94 having the shape indicated in the drawings. That distributor comprises an inverted, asymmetrical funnel 96, having its bottom end closed by a nozzle tray 98 having formed in the base thereof a plurality of transversely extending, dependent nozzles 100 which are equally spaced apart along the direction of movement of the upper run 32. The channels 101 between the nozzles 100 provide a substantial area for hot air from the orific nozzles to flow transversely along the upper surface of the sheet material as will be described. By ensuring a substantially constant velocity of the air flow across the width of the sheet they thereby contribute to the uniform heating which is a particularly advantageous feature of the oven 18. The nozzle tray is secured to the funnel 96 by bolts 155 screwed into the tray and extending through vertical slots 156 in the funnel.

The distributor is suspended from two transverse shafts 102, 104 carried in bearings 106 mounted on the side walls 76 of the heating chamber, by means of pairs of transversely spaced, parallel links 108,110, which links are secured on their respective shafts. The links are pivotally secured at their free ends to the respective sides of the distributor funnel 96, in a manner such that the distributor may be reciprocated to and fro in the direction of movement of the feedstock material on the conveyor assembly 30, and such that the nozzle tray always lies in a disposition parallel to the sheet material with the nozzles spaced by a small substantially constant spacing above the upper surface of the sheet material.

One of said transverse shafts (104) is carried through one side wall 76 of the heating chamber, and is coupled externally thereof by means of a torque arm 112, a connecting rod 114, and a crank pin and disc 116 to a distributor driving motor 118. Thus, rotation of that driving motor causes the distributor 94 to be reciprocated in the heating channel. Adjustment of the rate and extent of such reciprocation can be achieved by adjustment of the speed of the driving motor and the radial position of the crank pin on said crank disc 116. The height of the nozzles 100 above the sheet material may also be independently adjusted by means of adjusting slots 156.

The heating chamber 74 also contains within it, above the heating channel 62, a source of hot air generally indicated by the reference 120. That hot air source comprises at the upstream-end ("upstream" in the sense of the direction in which feedstock material is transported on the primary conveyor assembly 30) of the heating chamber, a compartment 122 in which is disposed a centrifugal fan 124 for re-ciculating the hot air, and which is dependent from and driven by a fan motor 126. That motor is disposed externally of the heating chamber and is carried on a support plate 128.

An outlet passage 132 leading from said air intake compartment 122 communicates with an inlet passage 134 which opens into the upwardly extending stem portion 136 of said inverted funnel 96 of the hot air distributor 94, via a horizontally disposed, spirally arranged duct system 138 which is generally located immediately beneath the roof 80 of the chamber 74. The duct system includes first and second electrical resistance heating units 140,142 (incorporating electrical resistance elements 143) disposed respectively on opposite sides of the upstanding stem portion 136 of the distributor 94, a U-shaped duct 144 disposed downstream of the distributor stem portion 136 (in relation to the sheet 14 movement) and interconnecting said heating units, a U-shaped duct 146 disposed upstream of the distributor stem portion 136 and interconnecting the second heating unit 142 with the inlet passage 134 of the distributor 94 via a horizontally aligned flexible duct 148. That flexible duct permits the desired reciprocation of the distributor 94 relative to the fixed hot air supply source.

An adjustable bleed valve 150 is provided for bleeding off hot air from the spiral-like duct arrangement during cooling, or if volatile gases require to be vented.

In operation of the module 72 described above, air heated by the heating elements 143 of the heating units 140, 142 is circulated within the module around a closed circuit which comprises, in series, the fan compartment 122 and its fan 124, outlet passage 132, duct system 138 (including the heating units), inlet passage 134, distributor 94 with its nozzles 100, heating channel 62 and thence back to the fan compartment 122.

In passing from the nozzles 100 to the heating channel 62, the hot air flows across the upper surface of the sheet material so heating the sheet material to the desired uniform temperature. The gas flow across the sheet material is primarily transversely of the module by virtue of the channels 101 (as previously mentioned), although some air flow will occur at the ends of the distributor, in the upstream and downstream directions of the module. Having moved away from the bottom of the nozzle tray the hot air returns to the fan 124 via substantial clearances which exist at all times between the sides of the distributor and the adjacent side walls of the module 72.

In the latter respect it is to be noted that the longitudinal dimensions of the heating channel 62 are 56 ins. (143.24 cm) whereas those of the distributor are, correspondingly, 48 ins. (121.92 cm). The amplitude of the reciprocation of the distributor is 2½ ins. (6.35 cm) and it will therefore be understood that the longitudinal dimension of the distributor is substantial in relation to that of the module and that during its reciprocation the distributor will cover the majority of the sheet material within the module.

The transverse plan dimensions of the heating channel 62 and the distributor 94 are resectively 24 ins. (60.96 cm) and 16 ins. (40.64 cm). The nozzles 100 individually occupy the whole width of the distributor, and with a typical width of the sheet material of 15½ ins. (39.37 cm) will accordingly extend beyond the side edges of the sheet material.

Thus, during its reciprocating movement the distributor 94 covers a substantial part of the sheet material within the oven, over the whole width of the latter. Furthermore, its reciprocation is intentionally mismatched with the indexing movements of the sheet material; typically, its reciprocation frequency is six cycles per minute whereas the sheet material is indexed forward, through 4 ins (10.16 cm) each time, fifteen times a minute. In combination these features ensure a high degree of temperature uniformity of the sheet material as it leaves the module, an accuracy of within ±1½° C. of the desired temperature being found to be possible across at least the whole of the useful width of the sheet required by the thermoforming operation. The sheet temperature itself can be adjusted as necessary by suitable control of the electrical energisation of the heating elements 143 and/or by adjustment of the height of the nozzle tray 98 in relation to the sheet material. Typically, the nozzles 100 are spaced 0.4 to 0.8 in. (10.16 to 20.32 mm), e.g. 0.5 in. (12.7 mm) above the sheet material. As previously mentioned, within each module the hot air circulates around a completely closed circuit; the temperature of the sheet material and its uniformity are therefore substantially unaffected by e.g. draughts in the vicinity of the oven. It will be noted in passing that the distributor 94 provides all the heat by which the temperature of the sheet material is raised to the required degree; in particular, no heat source is provided beneath the conveyor run 32.

By virtue of the uniformity of the sheet temperature which is available from the oven 18, applicants have found it possible to use containers thermoformed by the thermoforming apparatus for packages of e.g. food and beverage products which require thermal pasteurisation or sterilisation; this is despite the fact that the thermoforming operation may be in the solid phase of the sheet material, that is to say with the sheet material, if of polypropylene or polypropylene-based, having a temperature e.g. within the range of 150° C. to 160° C., for which the temperature of the hot air issuing from the nozzles will be about 165° to 200° C. A precise temperature will depend on factors such as volume flow rate and coefficient of heat transfer.

A wide range of conditions could be used in the design of the apparatus to exploit the benefits of the described approach to sheet heating, particularly if additional (e.g. infra-red) preheating units are used.

However, the following considerations are of general relevance in the design of the hot air modules.

(a) The heating method is, in essence, one sided.

(b) The thermal conductivity of polypropylene is, in common with most polymer materials, low, e.g. 0.15–0.2 W/(m.K), and this will strongly influence the heating time required. This property of the material, which may be temperature dependent, in combination with the specific heat determines the rate at which the sheet material can "accept" the heat.

(c) The "working life" of suitable types of PTFE-coated conveyors is generally enhanced if the hot air environment is not in excess of about 200° C.

Items (a) and (b) contrive to produce a temperature differential across the thickness of the sheet material. The magnitude of the temperature differential which can be tolerated throughout the thickness of the sheet in terms of the effect upon the quality of the thermo-formed article, will depend upon the user's requirements. It is probably generally desirable, for polypropylene materials, that this temperature differential be less than 10° C.

In the case of a semi-crystalline polymer, such as polypropylene, it is possible that some melting of the upper (i.e directly heated) surface may occur. The extent of this melting will be determined by the rate at which it is attempted to heat the sheet.

In order to achieve efficient heat transfer, turbulence must be generated at the sheet surface. It is seen as desirable that this air turbulence, and the "escape" of air from the sheet surface should be symmetrical with respect to the nozzle gap. Therefore, the preferred arrangement of the nozzles is perpendicular to the sheet surface.

The width of the nozzles is determined by the maximum sheet width to be heated. This parameter is independent of the actual nozzle gap.

The nozzle gap and nozzle pitch determine the volume flow rate of air for a particular air pressure within the nozzle distributor chambers. The efficiency of heat transfer to the sheet is determined by the nozzle design (e.g. the case of airflow away from the sheet), and the distance of the nozzle outlet above the sheet surface.

Care should be taken in the manufacture of the nozzles (e.g. to avoid varying nozzle gap) and this can constitute an expensive part of the construction of the apparatus, particularly if stainless steel is employed. Economic and practical considerations, therefore, mitigate against the use of a very small nozzle pitch, e.g. less than 1 in. (25.4 mm). Similarly, if the nozzle pitch is large, e.g. greater than 8 in. (203.2 mm), then this will increase the demands upon the performance of the nozzle oscillation mechanism. In practice a nozzle gap and pitch of 0.065 in. (1.65 mm) and 4 in. (101.6 mm), respectively, has been found to provide a convenient arrangement, using a distributor pressure of 3.5–4.0 in. pressure S.W.G. (872–996 Pa).

In the case of an nozzle pitch of 4.0 in. (101.6 mm), the frequency of oscillation has not been found critical, but it is preferably in the range of 0.5–1.5 times the thermo-forming cycle rate. Similarly, the preferred nozzle oscillation amplitude is 0.5–1.5 times the pitch betwen nozzles.

Using conventional heating (e.g. infrared ovens), containers thermoformed in the solid phase of the sheet material are often unsuitable for applications where thermal processing is required, because of excessive distortion of the containers during processing at least partly caused by uneven stresses generated in the structure of the sheet material prior to thermoforming, in particular during the heating operation. The oven shown and described enables these stresses to be limited substantially to any stresses remaining from the original extrusion of the sheet material; these are believed to be small and insufficient in themselves to cause any substantial distortion of the thermoformed containers after processing. Furthermore, the uniformity of heating achieved by the oven promotes uniform material distribution in the thermoforming of the container; this in turn leads to improved symmetry of the distribution of any thermoforming stresses, thereby further improving the thermal stability of the container during processing.

A further feature of the oven shown and described which is contributory to the temperature uniformity and substantially stress-free nature of the sheet material entering the thermoforming apparatus 20 is the freedom of the sheet material during its passage through the oven to expand or contract as required to accommodate thermal expansion and/or shrinkage due to the thermal release of existing stresses.

In this respect it will be noted that there are no side restraints within the modules 68, 70, 72 which are capable of generating substantial stresses or which may cause thermal masking of the sheet; the sheet is therefore free to move by sliding laterally and/or longitudinally in relation to the belt run 32 to accommodate itself to these changes.

The invention is not to be considered as being limited to the heating of thermoplastics sheet materials for thermoforming as particularly described, but may have wider application to the heating of sheet materials for whatever reason, particularly (but not necessarily) sheet materials which are moved in discrete indexing movements rather than with uniform velocity. The sheet materials need not necessarily take the form of essentially continuous webs drawn from a reel (as particularly described); they may, for example, be in the form of separate sheets or tiles which are individually fed manually or by machine.

We claim:

1. An apparatus for heating thermoplastic sheet materials comprising:
    an enclosure having an inlet opening and an outlet opening at opposite ends of said enclosure, wherein the thermoplastic sheet material enters and leaves said enclosure through the inlet opening and the outlet opening, respectively;
    a support means within said enclosure on which the thermoplastic sheet material rests;
    a hot gas delivery means within said enclosure for directing hot gas from a source thereof toward the thermoplastic sheet material resting on said support means; and
    a first drive means for reciprocally moving said hot gas delivery means within said enclosure along a path toward and away from the inlet and outlet openings, whereby the reciprocal movement of said gas delivery means enables hot gas to contact a substantial portion of the thermoplastic sheet material within said enclosure.

2. An appartus according to claim 1, further comprising:
    link means connecting said enclosure and said hot gas delivery means, whereby said hot gas delivery means is suspended by said link means from said enclosure.

3. An apparatus according to claim 2, wherein said first drive means is connected to said link means such that operation of said first drive means causes said link means to reciprocally move said hot gas delivery means within said enclosure toward and away from the inlet and outlet openings.

4. An apparatus according to claim 1, wherein said hot gas delivery means comprises:
    nozzle means for directing hot gas toward the thermoplastic sheet material.

5. An apparatus according to claim 4, wherein said nozzle means is defined by a plurality of channels each merging to a slot, the channels and the slots extending entirely across the sheet material and transverse to the path of movement by said hot gas delivery means.

6. An apparatus according to claim 5, wherein the slots have a width which will create turbulence adjacent the thermoplastic sheet material.

7. An apparatus according to claim 6, wherein the nozzle means has a pitch of 1 to 8 inches.

8. An apparatus according to claim 1, further comprising:
    gas recirculation means for recycling hot gas directed at the thermoplastic sheet material by said hot gas delivery means.

9. An apparatus according to claim 8, wherein said gas recirculation means comprises:
    a fan for conveying hot gas previously directed at the thermoplastic sheet material from said enclosure to said hot gas delivery means.

10. An apparatus according to claim 9, wherein said gas recirculation means further comprises:
    conduit means connecting said fan and said hot gas delivery means.

11. An apparatus according to claim 10, further comprising:
    link means connecting said enclosure and said hot gas delivery means, whereby said hot gas delivery means is suspended by said link means from said enclosure.

12. An apparatus according to claim 11, wherein at least part of said conduit is flexible to permit said hot gas delivery means to reciprocate along its path of movement relative to said enclosure.

13. An apparatus according to claim 10, wherein the source of hot gas is a resistance heater within said conduit means which heats gas conveyed by said fan to said hot gas delivery means.

14. An apparatus according to claim 8, further comprising:
    a bleed valve for removing gas from said gas recirculation means.

15. An apparatus according to claim 1, wherein the source of hot gas is a resistance heater.

16. An apparatus according to claim 1, wherein said enclosure is insulated.

17. An apparatus according to claim 1, wherein said enclosure is split into upper and lower parts at a level aligned with that of said support means, and wherein a hinge connects one edge of the upper and the lower parts, whereby the upper part can be pivotaly raised with respect to the lower part to expose said support means.

18. An apparatus according to claim 1, further comprising:
    at least one additional heater connected in series to said enclosure to effect further heating of the thermoplastic sheet material.

19. An apparatus for heating thermoplastic sheet material comprising:

an enclosure having an inlet opening and an outlet opening at opposite ends of said enclosure through which the thermoplastic sheet material can pass;

a first endless belt conveyor within said enclosure for supporting the thermoplastic sheet material;

a second endless belt conveyor with an input end adjacent the outlet opening of said enclosure and an output end farther from both the inlet and outlet openings of said enclosure than the input end of said second endless belt conveyor;

drive means for moving both said first and second endless belt conveyors in a synchronized manner, whereby said first endless belt conveyor supports the thermoplastic sheet material without significantly moving the thermoplastic sheet material, while said second endless belt conveyor effects significant movement of the thermoplastic sheet material through said enclosure; and a hot gas delivery means positioned to direct hot gas from a source thereof toward the thermoplastic sheet material.

20. An apparatus according to claim 19 further comprising:

gas recirculation means for recycling hot gas directed at the thermoplastic sheet material to said hot gas delivery means.

21. An apparatus according to claim 20, wherein said hot gas recirculation means comprises:

a fan for conveying hot gas previously directed at the thermoplastic sheet material to said hot gas delivery means.

22. An apparatus according to claim 21, wherein said gas recirculation means further comprises:

conduit means connecting said fan and said hot gas delivery means.

23. An apparatus according to claim 22, further comprising:

link means connecting said enclosure and said hot gas delivery means, whereby said hot gas delivery means is suspended by said link means from said enclosure.

24. An apparatus according to claim 23, wherein at least part of said conduit is flexible to permit said hot gas delivery means to reciprocate along its path of movement relative to said enclosure.

25. An apparatus according to claim 22, wherein the source of hot gas is a resistance heater within said conduit means to heat gas being conveyed by said fan to said hot gas delivery means.

26. An apparatus according to claim 20, further comprising:

a bleed valve for removing gas from said gas recirculation means.

27. An apparatus according to claim 19, wherein the source of hot gas is a resistance heater.

28. An apparatus according to claim 19, wherein said enclosure is insulated.

29. An apparatus according to claim 19, wherein said enclosure is split into upper and lower parts at a level aligned with where said first endless belt conveyor supports the thermoplastic sheet material, and wherein a hinge connects one edge of the upper and the lower parts, whereby the upper part can be pivotally raised with respect to the lower part to expose said first endless belt conveyor.

30. An apparatus according to claim 19, further comprising:

at least one additional heater connected in series to said enclosure to effect further heating of the thermoplastic sheet material.

31. An apparatus for thermoforming a thermoplastic sheet material into three dimensional shapes comprising:

an enclosure having an inlet opening and an outlet opening at opposite ends of said enclosure, wherein the thermoplastic sheet material enters and leaves said enclosure through the inlet opening and the outlet opening, respectively;

a support means within said enclosure on which the thermoplastic sheet material rests;

a hot gas delivery means positioned within said enclosure to direct hot gas from a source thereof toward the thermoplastic sheet material resting on said support means;

a first drive means for reciprocally moving said hot gas delivery means within said enclosure along a path toward and away from the inlet and outlet openings, whereby the reciprocal movement of said hot gas delivery means enables gas to contact a substantial portion of the thermoplastic sheet material within said enclosure; and a thermoforming device for forming the thermoplastic sheet material into three dimensional shapes after leaving the outlet opening of said enclosure.

32. An apparatus according to claim 31, wherein said support means is a first endless belt conveyor.

33. An apparatus according to claim 32, further comprising:

a second endless belt conveyor with an input end adjacent the outlet opening of said enclosure and an output end farther from both the inlet and outlet openings of said enclosure than is the input end of said second endless belt conveyor.

34. An apparatus according to claim 33, further comprising:

a second drive means for moving said first and second endless belt conveyors in a synchronized manner, whereby said first endless belt conveyor supports the thermoplastic sheet material without significantly moving the thermoplastic sheet material, while said second endless belt conveyor effects significant movement of the thermoplastic sheet material through said enclosure.

35. An apparatus according to claim 34, wherein said second endless belt conveyor is within said thermoforming device.

36. An apparatus according to claim 35, wherein said second endless belt conveyor is provided with teeth to engage and move the thermoplastic sheet material.

37. An apparatus according to claim 31, further comprising:

a second drive means for moving said second endless belt conveyor, whereby said second endless belt conveyor moves the thermoplastic sheet material through said enclosure.

38. An apparatus according to claim 37, wherein said second endless belt conveyor is within said thermoforming device.

39. An apparatus according to claim 38, wherein said second endless belt conveyor is provided with teeth to engage and move the thermoplastic sheet material.

40. A process of heating a thermoplastic sheet material in a heater comprising (a) a longitudinally-extending enclosure having an inlet opening and an outlet opening at opposite ends of said enclosure, wherein the thermoplastic sheet material is moved through said enclosure from the inlet opening to the outlet opening, (b) a hot gas delivery means within said enclosure for directing hot gas from a source thereof toward the thermoplastic sheet material, and (c) drive means for reciprocally moving said hot gas delivery means within said enclosure along a path toward and away from the inlet and outlet openings, whereby the reciprocal movement of said gas delivery means enables hot gas to contact a substantial portion of the thermoplastic sheet material within said enclosure, and then forming three dimensional shapes from the heated thermoplastic sheet, said process comprising:

conveying the thermoplastic sheet material through the inlet opening into said enclosure;

heating the thermoplastic sheet material within said enclosure by directing hot gas at the sheet material with said hot gas delivery means which said drive means moves along the path toward and away from the inlet and outlet openings;

conveying the heated thermoplastic sheet material through the outlet opening and out of said enclosure;

conveying the heated thermoplastic sheet into a thermoforming device; and forming three dimensional shapes from the thermoplastic sheet material with the thermoforming device.

41. A process according to claim 40 further comprising:

recirculating hot gas directed at the thermoplastic sheet material to said hot gas delivery means.

42. A process according to claim 41, wherein the source of hot gas is a resistance heater positioned to heat said recirculating hot gas.

43. A process according to claim 40, wherein said thermoforming device has an endless belt conveyor which effects said conveying the thermoplastic sheet material into the inlet opening of said enclosure, said conveying the heated thermoplastic sheet material through the outlet opening of said enclosure, and said conveying the heated thermoplastic sheet material into said thermoforming device.

44. A process according to claim 40, wherein the thermoplastic sheet material contains polypropylene.

45. A process according to claim 40, wherein the thermoplastic sheet material is a lengthy web.

46. A process according to claim 40, wherein said conveying the thermoplastic sheet material throught the inlet opening, said conveying the heated thermoplastic sheet material through the outlet opening, and said conveying the heated thermoplastic sheet material into the thermoforming device are all intermittent.

* * * * *